United States Patent [19]

Tummel

[11] 3,966,217

[45] June 29, 1976

[54] AUTOMATIC CHUCK

[75] Inventor: Harold Tummel, St. James, N.Y.

[73] Assignee: The Raymond Lee Organization, Inc., New York, N.Y. ; a part interest

[22] Filed: Apr. 22, 1975

[21] Appl. No.: 570,417

[52] U.S. Cl. .................................. 279/59; 85/1 L; 279/1 B
[51] Int. Cl.² ........................................ B23B 31/19
[58] Field of Search.................. 279/1 B, 60, 63, 64, 279/55, 56, 58, 59; 85/1 L, 32 V; 403/348, 349, 350

[56] References Cited
UNITED STATES PATENTS

| | | | |
|---|---|---|---|
| 3,702,705 | 11/1972 | Schadlich | 279/1 B X |
| 3,842,877 | 10/1974 | Andrews | 85/1 L X |

*Primary Examiner*—Othell M. Simpson
*Assistant Examiner*—Z. R. Bilinsky
*Attorney, Agent, or Firm*—Howard I. Podell

[57] ABSTRACT

A chuck for use in fastening a replaceable tool such as a drill to a rotatable shaft and particularly to a rotatable shaft powered by a motor. The chuck is in the form of a cylindrical housing formed with a taper at the tool end. A plurality of jaws, each formed with a convex or tapered surface are mounted in the tapered section of the housing with the convex or tapered side bearing against the inside tapered wall of the housing. A center pin is mounted in the housing with a first end of the pin bearing against the end of each jaw, such that motion of the pin towards the jaws forces the jaws against the tapered housing wall to close the jaws together. A cross-pin is transversely fixed through the center pin and extends through slots in the housing wall, with the slots oriented parallel to the axis of the center pin to permit both axial motion of the pin in the housing and rotation of the pin relative to the housing. The second end of the center pin is formed with a cross-section of oval shape, with a coarse male thread formed on its exterior surface that mates with a female thread in an oval shaped axial recess of a plug when the center pin is rotated a fraction of a turn with respect to the plug. Rotation of the pin in the contrary direction for a similar fraction of a turn results in completely freeing the center pin end from the plug recess threads, since the cross-section of the oval recess is larger than that of the center pin end, permitting the center pin to be freely moved in the axial direction of the housing for the purpose of opening or closing the jaws to an approximate setting. When the center pin is locked to the plug at a given position, by rotation of the plug to the center pin, a fine setting of the center pin axial position is achieved against the jaws by rotating the housing relative to the plug and locked center pin, the exterior of the plug being formed with a fine male thread that mates with a female thread on the inner wall of the housing. The plug extends past the end of the housing so as to join a rotatable motor shaft or drill fixture shaft.

1 Claim, 3 Drawing Figures

AUTOMATIC CHUCK

SUMMARY OF THE INVENTION

My invention is a chuck for use in fastening a replaceable tool such as a drill to a rotatable shaft and particularly to a rotatable shaft powered by a motor.

The chuck is in the form of a cylindrical housing formed with a taper at the tool end. A plurality of jaws, each formed with a convex or tapered surface are mounted in the tapered section of the housing with the convex or tapered side bearing against the inside tapered wall of the housing.

A center pin is mounted in the housing with a first end of the pin bearing against the end of each jaw, such that motion of the pin towards the jaws forces the jaws against the tapered housing wall to close the jaws together. A cross-pin is transversely fixed through the center pin and extends through slots in the housing wall, with the slots oriented parallel to the axis of the center pin to permit both axial motion of the pin in the housing and rotation of the pin relative to the housing.

The second end of the center pin is formed with a cross-section of oval shape, with a coarse male thread formed on its exterior surface that mates with a female thread in an oval-shaped axial recess of a plug when the center pin is rotated a fraction of a turn with respect to the plug.

Rotation of the pin in the contrary direction for a similar fraction of a turn results in completely freeing the center pin end from the plug recess threads, since the cross-section of the oval recess is larger than that of the center pin end, permitting the center pin to be freely moved in the axial direction of the housing for the purpose of opening or closing the jaws to an approximate setting.

When the center pin is locked to the plug at a given position, by rotation of the plug to the center pin, a fine setting of the center pin axial position is achieved against the jaws by rotating the housing relative to the plug and locked center pin, the exterior of the plug being formed with a fine male thread that mates with a female thread on the inner wall of the housing. The plug extends past the end of the housing so as to join a rotatable motor shaft or drill fixture shaft.

In use, the center pin is rotated relative to the plug to free the center pin inside the housing, permitting the jaws to be opened to the desired amount. The center pin is then manually pressed against the jaws to close the jaws against a drill inserted in the jaws and the center pin is rotated relative to the plug to lock it to the plug at a position where the end of the center pin bears against the jaws. The pin is now forced against the jaws to close them tightly by rotation of the plug relative to the housing, with the fine thread form of each member serving to move the plug and locked center pin in a direction perpendicular to the ends of the jaws.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 3:
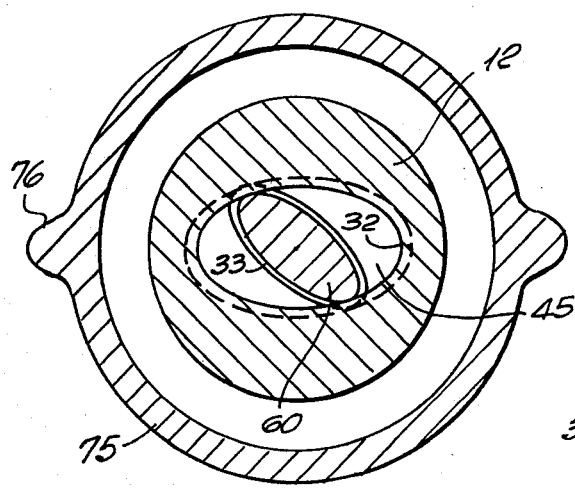
FIG. 3 is a sectional view of the invention taken along line 3—3 of FIG. 2.
Figure 1:
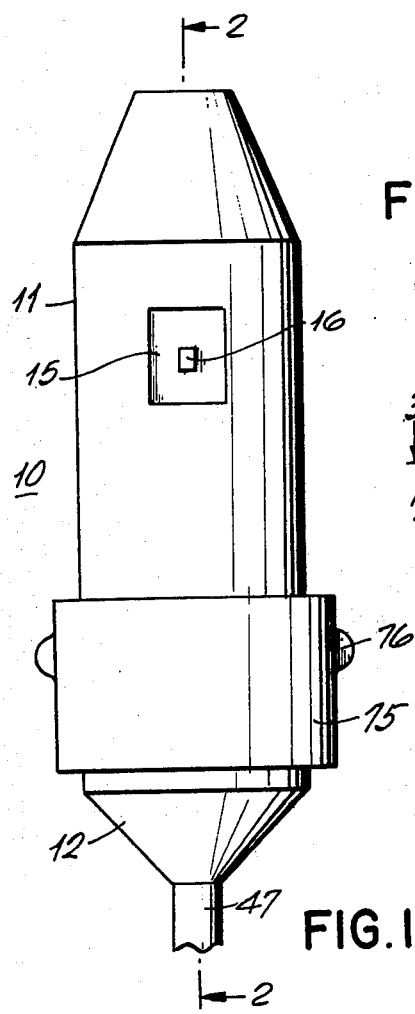
FIG. 1 is a perspective view of the invention.
Figure 2:
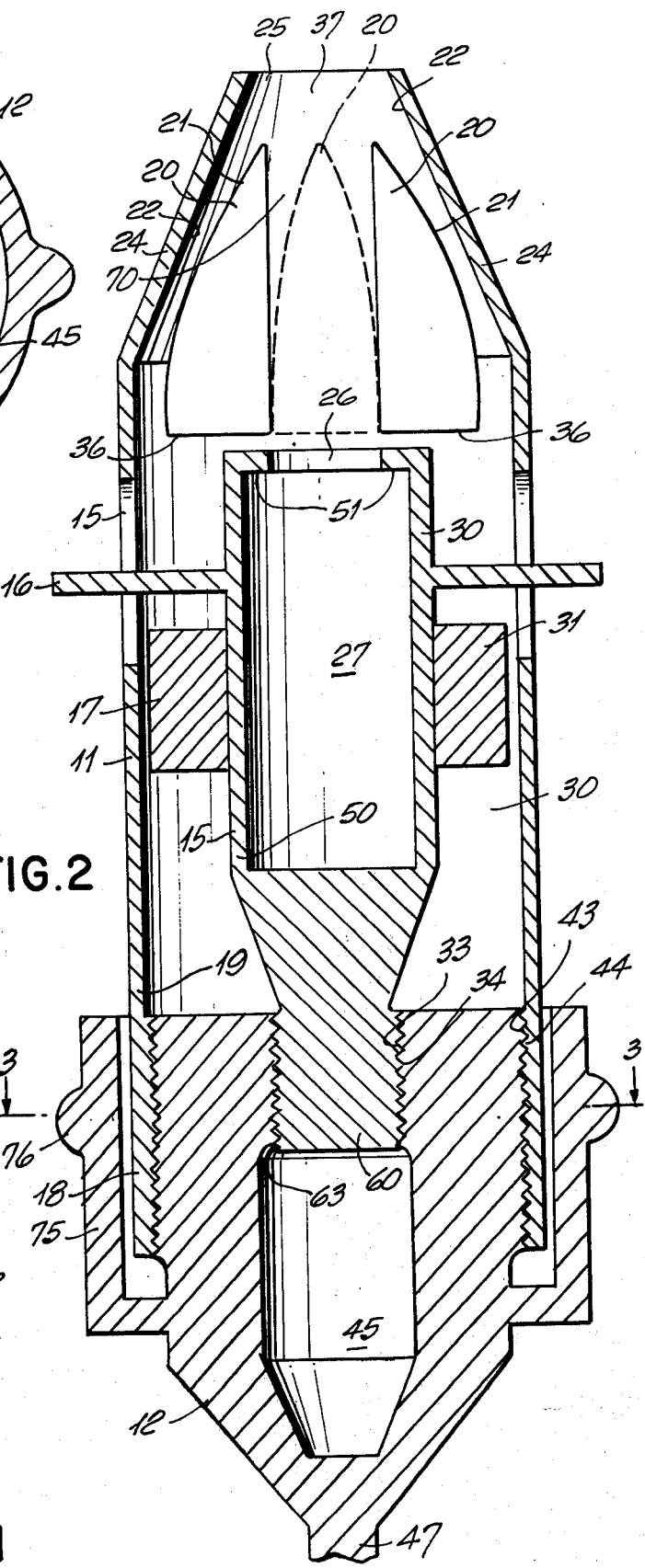
FIG. 2 is a sectional view of the invention taken along line 2—2 of FIG. 1.

Turning now descriptively to the drawings, in which similar reference characters denote similar elements throughout the several views, FIGS. 1-3 illustrate the chuck 10 which is formed with a hollow cylindrical housing 11 joined at a first end 18 by female fine threads 44 on the internal housing wall 19 to the male fine threads 43 on a plug member 12, the free end 47 of which is a rod adaptable for coupling to a motor armature or rotatable shaft. The free end section 24 of the housing 11 is formed as a taper, reducing in circular cross-section from the diameter of the housing 11 to the diameter of a smaller circular opening 25 at the free end of the housing. Opening 25 is of a size to permit inserting a drill bit (not shown) through opening 25 into the inside section 37 of the housing where the drill bit may be gripped by three loose jaws 20 inside the housing tapered section 24.

Each jaw 20 is shaped with a convex outer edge 21 that bears against the inside tapered housing wall surface 22 when the flat end jaw surface 36 is subject to compressive pressure by the free end 51 of center pin 50 mounted inside of housing 11. Free end 51 of center pin 50 is formed with an opening 26 of similar diameter to opening 25 of the housing end to permit a drill bit to freely pass into the hollow axial recess 27 of pin 50.

Pin 50 is fitted with a pair of cross-pins 16 that each extend from pin 50 through a slot 15 in the housing 11 to permit manual manipulation of pin 50.

A sleeve 31 is loosely fitted about pin 50 in housing interior 30 to hold pin 50 generally concentric to the axis of housing 50.

The inner end 60 of pin 50 is shaped as an oval cross-section, with a coarse male thread 33 formed on the exterior wall 63 of the pin 50. A central recess 45 in plug 12 is formed as an oval cross-section, with the major and minor diameters of oval recess 45 of somewhat larger size than the corresponding major and minor diameters of oval-shaped pin end 60, such that in one position, shown in FIG. 3, of pin 50 to plug 12, the male threads 33 of pin 50 are engaged with the female threads 32 of plug 12 to lock the two members together and prevent further rotation in the tightening direction of the two members to each other. However, when pin 50 is rotated a fraction of a turn in an unloosening direction, relative to plug 12, the two members are completely freed from threaded engagement with each other, and pin 50 may move in an axial direction, towards or away from jaws 20, to adjust the spacing of the jaws 20 to each other and to vary the size of the central opening 70 between jaws 20, in which a drill bit is to be located.

Once a drill bit has been placed between the opening 70 of jaws 20, the opening 70 is reduced in size by axial movement of pin 50 towards jaws 20. With pin 50 bearing against jaws 20, pin 50 is rotated relative to plug 12 to cause the oval-shaped threaded sections 32 and 33 to engage to lock pin 50 to plug 12. Housing 11 is then rotated relative to plug 12 in the tightening direction of engaged threads 43 and 44 to tighten jaws 20 further together.

Slots 15 in housing 11 are of a length and width to permit some rotation of housing 11 with respect to pin 16 and pin 50.

A collar 75 fitted with projections 76 extends from plug 12 freely over housing 11 to furnish a manual gripping surface.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A chuck fitted with jaws for holding a tool in detachable engagement with a shaft to which the chuck may be concentrically fastened; comprising a housing having a front tapered section and a rear open section, a plurality of jaws mounted inside the front section of the hollow tapered housing, a central pin located in the interior of the housing so as to bear, when moved towards the jaws, against the rear ends of the jaws, such bearing causing the sides of the jaws to slide against the taper to move the jaws together, a plug threadably engaged to the rear end of the housing, a pin transversely mounted to the central pin, said pin extending through a slot in the housing wall, in which the rear of the central pin is formed of an oval-shape cross-section and the plug is formed with a recess of oval-shaped and larger cross-section than the cross-section of the oval portion of the central pin, with the exterior of the oval section of the central pin formed as a male screw thread, and the interior surface of the oval-shaped recess of the plug formed as a female screw thread so that turning the central pin with respect to the plug locks said central pin against axial motion with respect to the plug.

* * * * *